United States Patent
Fröschle

(10) Patent No.: US 7,726,721 B2
(45) Date of Patent: Jun. 1, 2010

(54) DISPLACEABLE ROOF

(75) Inventor: Mathias Fröschle, Ostfildern (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 254 days.

(21) Appl. No.: 11/852,514

(22) Filed: Sep. 10, 2007

(65) Prior Publication Data

US 2008/0061595 A1 Mar. 13, 2008

(30) Foreign Application Priority Data

Sep. 8, 2006 (DE) ............... 10 2006 042 287

(51) Int. Cl.
*B60J 7/08* (2006.01)
*B60J 7/12* (2006.01)

(52) U.S. Cl. .................. 296/107.01; 296/107.07; 296/107.09; 296/108

(58) Field of Classification Search ........... 296/107.01, 296/108, 107.07, 107.09, 107.16, 107.17
See application file for complete search history.

(56) References Cited

U.S. PATENT DOCUMENTS

| | | | |
|---|---|---|---|
| 6,139,087 A | 10/2000 | Wolfmaier et al. | |
| 6,454,342 B2 * | 9/2002 | Heselhaus et al. | 296/107.07 |
| 6,767,046 B1 * | 7/2004 | Guillez et al. | 296/108 |
| 2003/0052507 A1 * | 3/2003 | Obendiek et al. | 296/107.01 |
| 2004/0094987 A1 * | 5/2004 | Salz et al. | 296/107.01 |
| 2004/0119316 A1 * | 6/2004 | Rosler et al. | 296/108 |
| 2005/0156449 A1 * | 7/2005 | Bruder et al. | 296/108 |

FOREIGN PATENT DOCUMENTS

DE 196 13 356 C2 10/1997

\* cited by examiner

*Primary Examiner*—Patricia L Engle
*Assistant Examiner*—SunSurraye Westbrook

(57) ABSTRACT

A displaceable roof in a vehicle, in particular a folding top in a motor vehicle, with a front first roof section for connecting to the frame of the windshield of the vehicle, a second roof section disposed after it, and two link configurations which are mounted on both sides of the center of the vehicle, connect the roof sections to each other. The link configurations contain at least two links which couple the two roof sections to each other in such a manner that the first roof section moves over the second roof section during closing or opening of the roof. The roof link configurations are mounted on both sides of the center of the vehicle in bearings fixed on the vehicle body and are articulated on the second roof section. Each roof link configuration is coupled to a link of the link configuration disposed on the same side of the vehicle, for the purpose of displacing the roof sections. Each roof link configuration for coupling to the associated link configuration of the roof sections has a coupling link which is articulated on it and is coupled at least to one of the links of the link configuration.

9 Claims, 1 Drawing Sheet

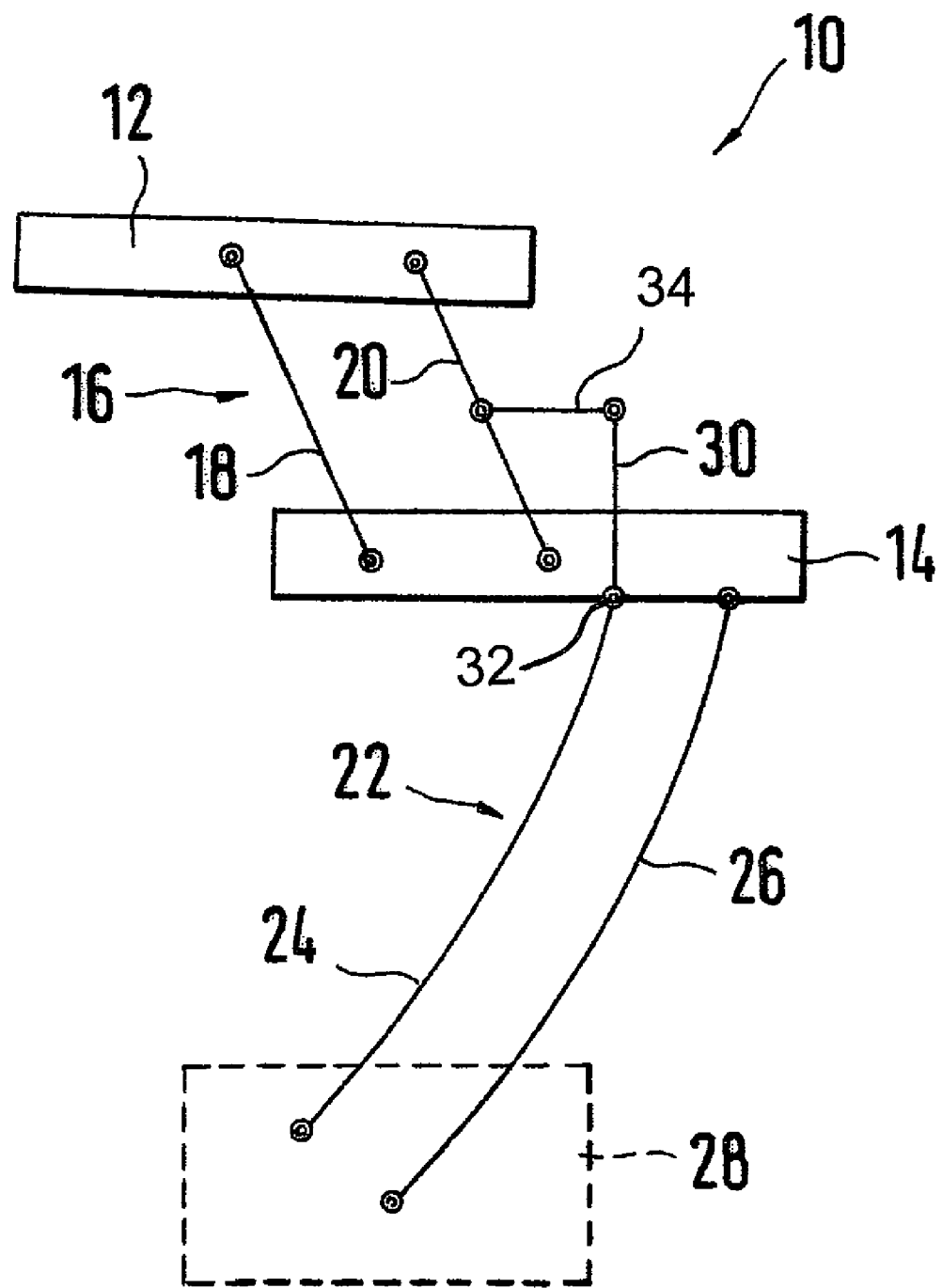

DISPLACEABLE ROOF

CROSS-REFERENCE TO RELATED APPLICATION

This application claims the priority, under 35 U.S.C. §119, of German application DE 10 2006 042 287.2, filed Sep. 8, 2006; the prior application is herewith incorporated by reference in its entirety.

BACKGROUND OF THE INVENTION

Field of the Invention

The invention relates to a displaceable roof in a vehicle, in particular a folding top in a motor vehicle. The roof has a first front roof section for connecting to a frame of a windshield of the vehicle and a second roof section disposed after the front first roof section. Two link configurations are disposed on both sides of a center of the vehicle. The two link configurations connect the first and second roof sections to each other. The link configurations each contain at least two links coupling the first and second roof sections to each other such that the first roof section moves over the second roof section during closing or opening of the displaceable roof. Bearings are fixed on a vehicle body. Roof link configurations are mounted on both sides of the center of the vehicle in the bearings and are articulated on the second roof section. Each of the roof link configurations are coupled to one of the links of the link configurations disposed on a same side of the vehicle, for displacing the first and second roof sections.

A displaceable roof of the type mentioned at the beginning is known, for example, from German patent DE 196 13 356 C2, corresponding to U.S. Pat. No. 6,139,087. In the case of this roof, two roof sections are provided which are coupled to each other at their sides by two link configurations in such a manner that the roof sections are disposed one behind the other during the closing of the roof and are put away one above the above during the opening of the roof. The rear roof section is supported by two roof link configurations which are disposed symmetrically with respect to each other on both sides of the center of the vehicle and, mounted in bearings fixed on the bodywork, are articulated on the second roof section, each roof link configuration being coupled to a link of the link configuration for the purpose of displacing the roof frames.

SUMMARY OF THE INVENTION

It is accordingly an object of the invention to provide a displaceable to which overcomes the above-mentioned disadvantages of the prior art devices of this general type, which, in particular, is constructed and can be fitted in a simple manner.

With the foregoing and other objects in view there is provided, in accordance with the invention, a displaceable roof in a vehicle. The displaceable roof contains a first roof section being a front roof section for connecting to a frame of a windshield of the vehicle and a second roof section disposed after the front roof section. Two link configurations are disposed on both sides of a center of the vehicle. The two link configurations connect the first and second roof sections to each other. The link configurations each contain at least two links coupling the first and second roof sections to each other such that the first roof section moves over the second roof section during closing or opening of the displaceable roof. Bearings are fixed on a vehicle body of the vehicle. Roof link configurations are mounted on both sides of the center of the vehicle in the bearings and are articulated on the second roof section. Each of the roof link configurations are coupled to one of the links of the link configurations disposed on a same side of the vehicle, for displacing the first and second roof sections. Each of the roof link configurations, for being coupled to an associated one of the link configurations of the first and second roof sections, has a coupling link articulated on the respective roof link configuration and is coupled at least to one of the links of the associated link configuration.

In the case of the roof according to the invention, rather than being coupled directly to the respectively assigned link configuration of the roof sections, the roof link configurations are coupled thereto by the intermediate connection of an additional coupling link in each case. The intermediate connection of the coupling link simplifies the fitting of the roof in comparison to the prior art, since the coupling link, as an additional element, can simply be adapted to a respective fitting position. Furthermore, the use of the coupling links as a connection element between the link configurations of the roof sections and the roof link configurations makes it possible for different types of roof sections to be fitted with their link configurations to one type of roof link configuration, with it being possible for adaptation of the roof link configurations to different link configurations to be omitted, since the functional connection takes place by the coupling links which can be configured in a variable manner.

In this context, displaceable roofs are understood as meaning roofs containing stiff roof sections which can be displaced relative to one another and can be connected to one another by link configurations and also conventional folding tops which are divided into individual roof sections which are coupled to one another by link configurations and are provided, at least in some sections, with a foldable top material, for example a top fabric. The individual roof sections can be configured as torsion-resistant roof elements, such as hard top segments. However, it is also conceivable to configure the roof sections in the form of closed or, if appropriate, partially open frames which are covered, for example with a to material. Roofs which are a combination of torsion-resistant roof elements and covered roof frames are also understood in this context as displaceable.

The link configurations connecting the two roof sections are preferably configured as a parallelogram link configuration. By use of parallelogram link configurations, the roof sections can be raised and lowered in a simple and elegant manner while, at the same time, the link configurations can also be driven in a simple manner. In the case of this embodiment, it is thus furthermore proposed to couple the coupling link to the rear of the two links of the parallelogram link configuration, as seen from the direction of the front end of the vehicle, by a joint. This enables direct driving of the parallelogram link configuration without the profile of the links having to be angled and bent in such a manner that the links do not obstruct one another during lowering of the roof.

In a preferred embodiment of the displaceable roof according to the invention, each roof link configuration has a roof link and a main link which are both articulated on the second roof section. To couple the roof link configuration, an extension is provided on the roof link, the extension extending beyond the joint on the second roof section, with which the roof link is articulated on the second roof section, and the coupling link which is coupled to the link configuration being articulated on the extension. The use of the extension enables particularly exact driving of the coupling link and therefore particularly exact moving of the individual roof sections with respect to one another, since, here too, the extension can be adapted in a simple manner to the respective structural conditions.

In this embodiment, when the roof is closed, the roof links preferably form the B pillars of the vehicle and are of appropriately stiff configuration such that even the torsion and bending forces which additionally arise during the shifting of the roof sections can easily be absorbed by the roof links.

The two roof link configurations are preferably connected to each other by at least one bow, which runs transversely with respect to the longitudinal axis of the vehicle, and thus form a third roof section. This additionally increases the rigidity of the entire roof, with the coupling between the roof link configurations and the link configurations of the roof sections also being particularly trouble-free on account of the resultantly reduced distortions of the entire roof construction.

Furthermore, it is proposed that at least one of the roof link configurations is coupled to a pivotable rear window carrier in order to drive the latter and/or to a pivotably mounted clamping hoop in order to drive the latter. This minimizes the outlay on control required, since all of the movable components of the displaceable roof are driven and actuated centrally by the roof link configurations.

Other features which are considered as characteristic for the invention are set forth in the appended claims.

Although the invention is illustrated and described herein as embodied in a displaceable roof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, side view of a detail of a displaceable roof according to the invention.

DETAILED DESCRIPTION OF THE INVENTION

Referring now to the single FIGURE of the drawing in detail, there is shown a roof 10 that has a front roof section 12, as seen from the direction of a front end of a vehicle, and a rear roof section 14 which is disposed behind it. The roof sections 12, 14 are coupled to each other by a link configuration 16 disposed symmetrically on both sides of a center of the vehicle.

Each link configuration 16 is formed by two links 18 and 20 which run approximately parallel to each other, are articulated on the two roof sections 12 and 14 and can be displaced in the form of a parallelogram. In this case, the lengths and the profile of the links 18 and 20 are selected in such a manner that, when the roof 10 is closed, the roof sections 12 and 14 merge one into the other flush with an upper side and lower side and, during the lowering or extension of the roof 10, the front roof section 12 is moved away over the rear roof section 14.

The two roof sections 12 and 14 are supported by two roof link configurations 22 disposed symmetrically with respect to each other on both sides of the center of the vehicle. In the exemplary embodiment illustrated, each roof link configuration 22 is formed from two links, a roof link 24 and a main link 26, which are articulated in the form of a four-bar linkage with their ends on the rear roof section 14 and with their lower ends on a roof bearing 28.

The upper end of each roof link 24 has an extension 30 which extends beyond a joint 32, with which the roof link 24 is articulated on the rear roof section 14, as the semi-extended position, shown in the FIGURE, of the roof 10 shows. The free end of the extension 30 is coupled via a joint to the one end of a coupling link 34 which, for its part, is coupled at its other end by a joint to the rear link 20 of the link configuration 16.

During displacement of the roof 10, the coupling of the roof link 24 via the extension 30 and the coupling link 34 now enables the movement of the roof link 24 to be transmitted directly to the rear link 20 and therefore to the entire link configuration 16. In the process, the joints between the coupling link 34 and the extension 30 and also between the rear roof section 14 and the roof link 24 ensure that, when the roof 10 is closed, all of the links 18, 20 and 34 run along the roof edges.

The driving according to the invention of the roof sections 12 and 14 with the use of the coupling link 34 permits a particularly trouble-free and simple sequence of movement during the opening and closing of the roof 10.

The invention claimed is:

1. A displaceable roof in a vehicle, comprising:
a first roof section being a front roof section for connecting to a frame of a windshield of the vehicle;
a second roof section disposed after said front roof section;
two link configurations disposed on both sides of a center of the vehicle, said two link configurations connect said first and second roof sections to each other, said link configurations each contain at least two links coupling said first and second roof sections to each other such that said first roof section moves over said second roof section during closing or opening of the displaceable roof, each of said links having a respective first pivot point in said first roof section and a respective second pivot point in said second roof section;
bearings fixed on a vehicle body; and
roof link configurations mounted on both sides of the center of the vehicle in said bearings and being articulated on said second roof section, each of said roof link configurations being coupled to one of said links of said link configurations disposed on a same side of the vehicle for displacing said first and second roof sections, each of said roof link configurations having a respective coupling link articulated thereon and being coupled at least to one of said links of said associated link configuration at a third pivot point between said respective first pivot point and said respective second pivot;
each of said roof link configurations having a respective roof link and a main link both being articulated on said second roof section, one of said roof link and said main link having an extension, said extension extending beyond a joint on said second roof section, and said coupling link being articulated on said extension.

2. The displaceable roof according to claim 1, wherein each of said link configurations connecting said first and second roof sections is a parallelogram link configuration.

3. The displaceable roof according to claim 2, wherein said coupling link is coupled to a rear one of said two links of said parallelogram link configuration, as seen from a direction of a front end of the vehicle, by a joint.

4. The displaceable roof according to claim 1, wherein when the displaceable roof is closed, said roof link forms a B pillar of the vehicle.

5. The displaceable roof according to claim 1, wherein at least one of said roof link configurations is coupled to a pivotable rear window carrier to drive the pivotable rear window carrier.

6. The displaceable roof according to claim 1, wherein at least one of said roof link configurations is coupled to a pivotably mounted clamping hoop to drive the pivotably mounted clamping hoop.

7. The displaceable roof according to claim 1, wherein the displaceable roof is a folding top of the vehicle.

8. The displaceable roof according to claim 1, wherein said extension is articulated with said roof link.

9. A motor vehicle, comprising:
a transmission;
at least one axle;
at least one driving engine being an internal combustion engine and driving said at least one axle via said transmission; and
a displaceable roof containing:
  a first roof section being a front roof section for connecting to a frame of a windshield of the vehicle;
  a second roof section disposed after said front first roof section;
  two link configurations disposed on both sides of a center of the vehicle, said two link configurations connect said first and second roof sections to each other, said link configurations each contain at least two links coupling said first and second roof sections to each other such that said first roof section moves over said second roof section during closing or opening of the displaceable roof, each of said links having a respective first pivot point in said first roof section and a respective second pivot point in said second roof section;
  bearings fixed on a vehicle body; and
  roof link configurations mounted on both sides of the center of the vehicle in said bearings and being articulated on said second roof section, each of said roof link configurations being coupled to one of said links of said link configurations disposed on a same side of the vehicle for displacing said first and second roof sections, each of said roof link configurations having a respective coupling link articulated thereon and being coupled at least to one of said links of said associated link configuration at a third pivot point between said respective first pivot point and said respective second pivot;
  each of said roof link configurations having a respective roof link and a main link both being articulated on said second roof section, one of said roof link and said main link having an extension, said extension extending beyond a joint on said second roof section, and said coupling link being articulated on said extension.

* * * * *